(12) United States Patent
Wakamatsu et al.

(10) Patent No.: US 7,422,705 B2
(45) Date of Patent: Sep. 9, 2008

(54) PREPARATION METHOD OF RARE EARTH ACTIVATED ALKALINE EARTH METAL FLUOROHALIDE STIMULABLE PHOSPHOR PRECURSOR, RARE EARTH ACTIVATED ALKALINE EARTH METAL FLUOROHALIDE STIMULABLE PHOSPHOR AND RADIOGRAPHIC IMAGE CONVERSION PANEL

(75) Inventors: Hideaki Wakamatsu, Hachioji (JP); Hiroyuki Nabeta, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 314 days.

(21) Appl. No.: 11/342,543

(22) Filed: Jan. 31, 2006

(65) Prior Publication Data

US 2006/0175577 A1 Aug. 10, 2006

(30) Foreign Application Priority Data

Feb. 4, 2005 (JP) ............................. 2005-028652

(51) Int. Cl.
*C09K 11/61* (2006.01)
*C09K 11/55* (2006.01)
(52) U.S. Cl. ............................................. 252/301.4 H
(58) Field of Classification Search .......... 252/301.4 H; 250/581
See application file for complete search history.

(56) References Cited

U.S. PATENT DOCUMENTS 6,168,730 B1 * 1/2001 Nabeta et al. ......... 252/301.4 H
6,383,412 B1 * 5/2002 Hasegawa ............ 252/301.4 H
6,638,447 B2 * 10/2003 Wakamatsu et al. ... 252/301.4 H

FOREIGN PATENT DOCUMENTS

JP 11-29324 * 2/1999
JP 2003-268369 * 9/2003

OTHER PUBLICATIONS

Translation for JP 11-29324.*
Translation for JP 2003-268369, claims and spec.*

* cited by examiner

*Primary Examiner*—C. Melissa Koslow
(74) *Attorney, Agent, or Firm*—Finnegan, Henderson, Farabow, Garrett & Dunner, L.L.P.

(57) ABSTRACT

A preparation method of a precursor of a rare earth activated alkaline earth metal fluorohalide stimulable phosphor is disclosed, comprising (A) adding an aqueous solution of an inorganic fluoride into a mother liquor containing a barium halide to form a reaction mixture containing a precipitate of a precursor of the stimulable phosphor, and (B) removing a solvent from the reaction mixture to obtain a concentrated reaction mixture, wherein the steps (A) and (B) are concurrently performed over periods of a and b, respectively, and meeting the following requirement:

$0.25 < a/b < 0.95$.

A preparation method of the stimulable phosphor and a radiation image conversion panel using the stimulable phosphor are also disclosed.

8 Claims, No Drawings

PREPARATION METHOD OF RARE EARTH ACTIVATED ALKALINE EARTH METAL FLUOROHALIDE STIMULABLE PHOSPHOR PRECURSOR, RARE EARTH ACTIVATED ALKALINE EARTH METAL FLUOROHALIDE STIMULABLE PHOSPHOR AND RADIOGRAPHIC IMAGE CONVERSION PANEL

This application claims priority from Japanese Patent Application No. JP2005-029652, filed on Feb. 4, 2005, which is incorporated hereinto by reference.

FIELD OF THE INVENTION

The present invention relates to a preparation method of a rare earth activated alkaline earth metal fluoroiodide stimulable phosphor precursor (hereinafter, also denoted as a stimulable phosphor precursor, a phosphor precursor or precursor), a rare earth activated alkaline earth metal fluoroiodide stimulable phosphor (hereinafter, also denoted as a stimulable phosphor or a phosphor) and a radiographic image conversion panel for medical use.

BACKGROUND OF THE INVENTION

As an effective means for replacing conventional radiography known is a recording and reproducing method of radiation images using stimulable phosphors described in JP-A No. 55-12148 (hereinafter, the term, JP-A refers to an unexamined Japanese Patent Application Publication). In the method, a radiographic image conversion panel (hereinafter, also simply denoted as panel) comprising a stimulable phosphor is employed, and the method comprises the steps of causing the stimulable phosphor of the panel to absorb radiation having passed through an object or having been radiated from an object, sequentially exciting the stimulable phosphor with an electromagnetic wave such as visible light or infrared rays (hereinafter referred to as "stimulating rays") to release the radiation energy stored in the phosphor as light emission (stimulated emission), photo-electrically detecting the emitted light to obtain electrical signals, and reproducing the radiation image of the object as a visible image from the electrical signals. The panel, having been read out, is then subjected to image-erasing and prepared for the next photographing cycle. Thus, the radiographic image conversion panel can be used repeatedly.

In the radiation image recording and reproducing methods described above, a radiation image is advantageously obtained with a sufficient amount of information by applying radiation to an object at a considerably smaller dose, as compared to conventional radiography employing a combination of a radiographic film and a radiographic intensifying screen. Further, in conventional radiography, the radiographic film is consumed for every photographing; on the other hand, in this radiation image converting method, in which the radiographic image conversion panel is employed repeatedly, is also advantageous in terms of conservation of resources and overall economic efficiency.

The radiographic image conversion panel employed in the radiation image recording and reproducing method basically comprises a support and provided thereon a phosphor layer (stimulable phosphor layer), provided that, in cases where the phosphor layer is self-supporting, the support is not necessarily required. The stimulable phosphor layer comprises a stimulable phosphor dispersed in a binder. There is also known a stimulable phosphor layer, which is formed by vacuum evaporation or a sintering process, free from a binder, and which comprises an aggregated stimulable phosphor. There is further known a radiographic image conversion panel in which a polymeric material is contained in the openings among the aggregated stimulable phosphor. On the surface of the stimulable phosphor layer (i.e., the surface which is not in contact with the support) is conventionally provided a protective layer comprising a polymeric film or an evaporated inorganic membrane to protect the phosphor layer from chemical deterioration and physical shock.

The stimulable phosphor, after being exposed to radiation, produces stimulated emission upon exposure to the stimulating ray. In practical use, phosphors are employed, which exhibit an emission within a wavelength region of 300 to 500 nm stimulated by stimulating light of wavelengths of 400 to 900 nm. Examples of such stimulable phosphors include rare earth activated alkaline earth metal fluorohalide phosphors described in JP-A Nos. 55-12145, 55-160078, 56-74175, 56-116777, 57-23673, 57-23675, 58-206678, 59-27289, 59-27980, 59-56479 and 59-56480; bivalent europium activated alkaline earth metal fluorohalide phosphors described in JP-A Nos. 59-75200, 6-84381, 60-106752, 60-166379, 60-221483, 60-228592, 60-228593, 61-23679, 61-120882, 61-120883, 61-120885, 61-235486 and 61-235487; rare earth element activated oxyhalide phosphors described in JP-A 59-12144; cerium activated trivalent metal oxyhalide phosphors described in JP-A No. 55-69281; bismuth activated alkaline metal halide phosphors described in JP-A No. 60-70484; bivalent europium activated alkaline earth metal halophosphate phosphors described in JP-A Nos. 60-141783 and 60-157100; bivalent europium activated alkaline earth metal haloborate phosphors described in JP-A No. 60-157099; bivalent europium activated alkaline earth metal hydrogenated halide phosphors described in JP-A 60-217354; cerium activated rare earth complex halide phosphors described in JP-A Nos. 61-21173 and 61-21182; cerium activated rare earth halophosphate phosphors described in JP-A No. 61-40390; bivalent europium activated cesium rubidium halide phosphors described in JP-A No 60-78151; bivalent europium activated cerium halide rubidium phosphors described in JP-A No. 60-78151; bivalent europium activated composite halide phosphors described in JP-A No. 60-78153. Specifically, iodide-containing bivalent europium activated alkaline earth metal fluorohalide phosphors, iodide containing rare earth metal activated oxyhalide phosphors and iodide containing bismuth activated alkaline earth metal halide phosphors exhibited stimulated emission of high luminance.

Along with the spread of radiographic image conversion panels employing stimulable phosphors is further desired an enhancement of radiation image quality, such as enhancement in sharpness and graininess.

The foregoing preparation methods of stimulable phosphors are called a solid phase process or calcination method, in which pulverization after calcination is indispensable, however, there were problems such that it was difficult to control the particle form affecting sensitivity and image performance. Of means for enhancing image quality of radiation images is valid preparation of fine particles of a stimulable phosphor and enhancing particle size uniformity of the fine stimulable phosphor particles, i.e., narrowing the particle size distribution.

Preparation of stimulable phosphors in the liquid phase described in JP-A 7-233369 and 9-291278 is a method of obtaining a stimulable phosphor precursor in the form of fine particles by adjusting the concentration of a phosphor raw material solution, which is valid as a method of preparing stimulable phosphor powder having a narrow particle size distribution. Of rare earth activated alkaline earth metal fluorohalide stimulable phosphors, a phosphor having higher iodide content is preferred in terms of reduction of radiation exposure. This is due to the fact that iodine exhibits a higher X-ray absorption than bromine.

Alkaline earth metal fluoroiodide stimulable phosphors prepared in the liquid phase are advantageous in luminance and graininess but when a precursor thereof is prepared in the liquid phase, the following problems arise. Thus, as described in JP-A 9-291278 and 10-88125, the precursor crystals are prepared in such a manner that: (i) barium iodide is dissolved in water or organic solvents and to the obtained solution, an inorganic iodide solution is added with stirring; or (ii) ammonium fluoride is dissolved in water and to the obtained solution, a barium iodide solution is added with stirring. However, in (i), low barium iodide needs to be present in excess in the solution and the stoichiometric ratio of barium iodide to barium fluoroiodide obtained after solid-liquid separation to added barium iodide often exhibits as small a value as 0.4 or so. Thus, the yield of an alkaline earth metal fluoroiodide stimulable phosphor is often about 40 of the added barium iodide. Even in (ii), excess barium iodide is needed for inorganic fluoride and the yield is also low. Thus, there are problems that the liquid phase synthesis of barium fluoroiodide results in a lower yield, consequently leading to lowered productivity. Reducing the concentration of barium iodide in the mother liquor to enhance the yield results in an increase of particle size, leading to deteriorated image quality.

To enhance the yield of a rare earth activated alkaline earth metal stimulable phosphor, specifically, an alkaline earth metal fluoroiodide stimulable phosphor, JP-A 11-29324 discloses a method for obtaining cubic or rectangular rare earth element-containing barium fluoroiodide crystals having a basic composition of BaFI:xLn (in which Ln: is at least a rare earth element selected from Ce, Pr, Sm, Eu, Gd, Tb, Tm and Yb, $0 < x \leq 0.1$) which is obtained by adding a fluorine source to the mother liquor and concentrating the solution.

SUMMARY OF THE INVENTION

As a result of follow-up of the method disclosed in JP-A 11-29324 by the inventors of this application, however, it was proved that although cubic or rectangular BaFI crystals were formed, the concentration by spontaneous evaporation markedly lowered its productivity and was industrially unacceptable. It was also proved that the thus obtained cubic or rectangular crystal particles exhibited larger sizes and the particle size distribution was rather broad, leading to deteriorated image characteristics which was unacceptable in practical use.

It was further proved that concurrent performance of addition and concentration of an inorganic fluoride described in JP-A No. 2003-268369 resulted in formation of barium fluoroiodate at a high yield. However, it was also proved that broadening of the particle size distribution of a stimulable phosphor resulted, leading to deteriorated characteristics of a radiation image conversion panel, specifically, lowered luminance and sharpness.

Accordingly, it is an object of the present invention to provide a method of preparing a rare earth activated alkaline earth metal fluoroiodide stimulable phosphor precursor efficiently, a rare earth activated alkaline earth metal fluoroiodide stimulable phosphor obtained from the precursor and a radiation image conversion panel comprising the stimulable phosphor and exhibiting enhanced sensitivity and improved image quality.

Thus, one aspect of this invention is directed to a preparation method of a precursor of a rare earth activated alkaline earth metal fluorohalide stimulable phosphor represented by the following formula (1)

$$Ba_{(1-x)}M_{2(x)}FBr_{(y)}I_{(1-y)}:aM_1, bLn, cO \qquad \text{formula (1)}$$

wherein $M_1$ is at least an alkali metal selected from the group consisting of Li, Na, K, Rb and Cs; $M_2$ is at least an alkaline earth metal selected from the group consisting of Be, Mg, Ca and Sr; Ln is at least one rare earth element selected from the group consisting of Ce, Pr, Sm, Eu, Gd, Tb, Tm, Dy, Ho, Nd, Er and Yb; and x, y, a, b and c are values meeting the following conditions:

$$0 \leq x \leq 0.3, 0 \leq y \leq 0.3, 0 \leq a \leq 0.05 \; 0 < b \leq 0.2 \text{ and } 0 \leq c \leq 0.1$$

the method comprising the steps of:

(A) adding an aqueous solution of an inorganic fluoride into a mother liquor containing a barium halide to form a reaction mixture containing a precipitate of a precursor of the stimulable phosphor, and (B) removing a solvent from the reaction mixture to obtain a concentrated reaction mixture, wherein the steps (A) and (B) are performed concurrently, meeting the following requirement:

$$0.25 < a/b < 0.95$$

wherein a is a duration of the step (A), expressed in minute and b is a duration of the step (B), expressed in minute.

Further, it is preferred that the ratio by weight of the reaction mixture of after removal of the solvent to that before the removal is within the range of from 0.05 to 0.97; and the reaction mixture is heated to remove a reaction solvent and other means for removing other solvent(s) is employed singly or in combination.

Another aspect of the invention is a preparation method of a rare earth activated alkaline earth metal fluorohalide stimulable phosphor represented, comprising subjecting the foregoing precursor to calcination at a temperature of 400 to 1300° C. over a period of 0.5 to 12 hr. to obtain a rare earth activated alkaline earth metal fluorohalide stimulable phosphor. Further, the calcination is conducted preferably in an atmosphere containing oxygen.

Another aspect of the invention is directed to a radiation image conversion panel comprising a phosphor layer containing a stimulable phosphor, wherein the stimulable phosphor is a rare earth activated alkaline earth metal fluorohalide stimulable phosphor described above.

PREFERRED EMBODIMENTS OF THE INVENTION

Representative embodiments of the preparation method of a rare earth activated alkaline earth metal fluorohalide stimulable phosphor according to this invention will now be described.

The preparation method of a stimulable phosphor precursor described in JP-A 10-140148 and the apparatus for preparing a phosphor precursor described in JP-A 10-147778 are preferably applicable to preparing a stimulable phosphor precursor by a liquid phase. The stimulable phosphor precursor refers to the state at which a material represented by the foregoing formula (I) has not yet been subjected to a temperature of 400° C. or higher and the stimulable phosphor precursor emits neither stimulated emission nor instantaneous emission.

In this invention, the precursor is preferably prepared by the liquid phase synthesis. Thus, the precursor of a rare earth activated alkaline earth metal fluorohalide stimulable phosphor of formula (1) is preferably prepared through the liquid phase process in which the particle size can be easily controlled, rather than through the solid phase process in which control of the particle form is difficult. It is specifically preferred to prepare a precursor of a stimulable phosphor through the liquid phase process.

Thus, the method of preparing a precursor of a stimulable phosphor and the stimulable phosphor comprises the steps of:

preparing within a reaction vessel an aqueous mother liquor containing $BaI_2$ at a concentration of at least 3.0 mol/l (preferably, at least 3.3 mol/l) and a halide of Ln, provided that when "x" of the formula (I) is not zero, the mother liquor further contains a halide of $M_2$ and when "y" of the formula (I) is not zero, the mother liquor further contains $BaBr_2$ and a halide of $M_1$;

adding an aqueous solution containing at least 3 mol/l (preferably at least 6 mol/l) of inorganic fluoride (preferably, ammonium fluoride or alkali metal fluoride) into the mother liquor to form a crystalline precipitate of a precursor of a rare earth activated alkaline earth metal fluorohalide stimulable phosphor, removing a solvent from the reaction mother liquor with adding the inorganic fluoride;

separating the crystalline precipitate of the precursor from the mother liquor; and calcining the separated precursor precipitate with avoiding sintering.

Next, preparation of stimulable phosphors will be detailed. Thus, crystalline precipitates of a phosphor precursor and a stimulable phosphor can be prepared as follows.

Initially, material(s) except for a fluoride compound are dissolved in an aqueous medium. Thus, a barium halide, e.g., $BaI_2$ and a halide of Ln (and if necessary, a halide of $M^2$ and a halide of $M_1$) are each added into an aqueous solvent and dissolved with stirring to prepare an aqueous solution. The amounts of a barium halide (e.g., $BaI_2$) and the aqueous solvent are adjusted in advance so as to have 3.0 mol/l or more (and preferably 3.3 mol/l or more) of a concentration of a barium halide (e.g., $BaI_2$). Insufficient barium concentrations do not form a precursor with the intended composition or forms precursor particles with excessively larger sizes even if obtained. As a result of studies by the inventors, it was proved that fine precursor particles can be obtained at a concentration of 3.0 mol/l or more. A small amount of acid, ammonia, alcohol, water-soluble polymer or fine grained powder of water-insoluble metal oxide may be added thereto. It is also preferred that lower alcohols (e.g., methanol, ethanol) are added within a range which markedly lowers the solubility of $BaI_2$.

Subsequently, an aqueous solution of an inorganic fluoride (such as ammonium fluoride or alkali metal fluoride) is introduced into the reaction mother liquor maintained at 50° C. or more with stirring, through a pipe provided with a pump. The aqueous solution is preferably introduced to a portion in which stirring is vigorously performed. Introduction of the aqueous fluoride solution into the reaction mother liquor results in precipitation of precursor crystals of the rare earth activated alkaline earth metal fluorohalide phosphor represented by the foregoing formula (I).

Removal of solvent from the reaction mother liquor to concentrate the reaction mixture is started simultaneously with the addition of the aqueous fluoride solution. The ratio of the weight after removal of solvent to that of before removal of solvent is preferably from 0.05 to 0.97. Formation of crystalline BFI is not often completed at a ratio of more than 0.97. Excessive removal results in excessively increased viscosity of the reaction mixture, often producing troubles in handling. It is therefore preferred to remove a solvent at a ratio of not less than 0.05.

The time required for solvent removal largely affects not only productivity but also the particle shape and the particle size distribution, so that an optimal removal method is selected. In general, the reaction mixture is heated to evaporate a solvent and this method is also beneficial in this invention. Removal of solvents can obtain a precursor having a desired composition.

Another method of removing a solvent is preferably employed in combination to enhance productivity and retain optimal particle shape. The use of a separation membrane such as a reverse osmosis membrane can also be selected. In this invention, the following removing methods are preferred in terms of productivity.

1. Dry Gas Blowing

In a closed reaction vessel, two or more openings are provided, through which dry gas is allowed to pass. Any gas is optionally selected but common air or nitrogen is preferred in terms of safety. The solvent is removed concomitantly with the blowing gas, depending on the saturated water vapor content in the gas. Besides permeating through openings in the reaction vessel, it is useful to allow the gas to bubble through a liquid phase to cause the solvent to be absorbed into the bubbles.

2. Evacuation

As is well known, vapor pressure is lowered by evacuation. Thus, a solvent is efficiently removed under reduced pressure, that is, by maintaining the inside of a reaction vessel containing a reaction vessel under reduced pressure. The extent of the reduced pressure is optimally selected, depending on the kind of solvent. In cases where water is used as a solvent, for example, the reduced pressure is preferably not more than $8.65 \times 10^4$ Pa.

3. Liquid Membrane Formation

Removal of a solvent can be efficiently effected by enlarging the vaporization area. In cases when undergoing reaction by heating with stirring in a reaction vessel of a given volume, heating is generally done in such a manner that a heating means is immersed into the liquid or is provided outside the vessel. In this case, the heat transfer area is limited to the portion of the heating means in contact with the liquid, so that the heat transfer area decreases with removal of the solvent, retarding removal of the solvent. To prevent such retardation, using a pump or a stirrer, the reaction solution is sprayed onto the wall of the reaction vessel to increase the heat transfer area. This method of spraying liquid onto the wall of the reaction vessel to form a liquid membrane is known as a wetted wall method. The wetted wall can be formed not only using a pump but also using a stirrer described in JP-A 6-335627 and 11-235522.

These methods are employed alone or in combination. Examples thereof include the combination of the formation of the wetted wall and maintaining the reaction vessel under the reduced pressure and the combination of the formation of the wetted wall and dry gas aeration. Of these, the former is preferred, as described in JP-A 6-335627.

In this invention, the addition of an aqueous fluoride solution and the concentration of the reaction mixture are controlled within the range of time. Thus, the ratio of the addition time (a), expressed in minute, to the concentration time (b), expressed in minute, is within the range of 0.25<a/b<0.95.

A ratio of an addition time to concentration time of 0.95 or more, in which addition is continued almost until the final point of concentration, results in lowered phosphor characteristics. A ratio of an addition time to concentration time of 0.25 or less, in which addition causes a reaction at a relatively high Br concentration, results in formation of tabular grains, which are sintered, leading to deteriorated phosphor characteristics.

The resulting crystals of the phosphor precursor are separated from the solution through filtration or centrifugation, washed sufficiently with liquid such as methanol and then dried. To the dried crystals of the phosphor precursor is added an anti-sintering agent such as fine alumina powder or fine silica powder, which adheres to the surface of the crystals. It is possible to save addition of the anti-sintering agent by selecting the calcination conditions.

Further, the phosphor precursor crystals are charged into a heat-resistant vessel such as a silica port, an alumina crucible or a silica crucible and then placed in the core portion of an electric furnace to be calcined, without causing the crystals to sinter. The furnace core of an electric furnace is limited to those in which the atmosphere is replaceable during calcination. As the furnace is preferably employed a moving bed type electric furnace, such as a rotary kiln. As a calcinations atmosphere is employed a nitrogen gas atmosphere, a neutral atmosphere such as an argon gas atmosphere, a nitrogen gas atmosphere containing a small amount of hydrogen gas, a weakly reducible atmosphere such as a carbon dioxide atmosphere containing carbon monoxide, or an atmosphere containing a small amount of oxygen. In this invention, an atmosphere containing a small amount of oxygen (at an oxygen content of not more than 10% by volume, preferably 1% to 5% by volume) is preferred. Calcination is effected preferably employing the method described in JP-A 2000-8034. Thus, a rare earth activated alkaline earth metal fluorohalide stimulable phosphor can be obtained through the calcinations described above.

The stimulable phosphor particles relating to this invention preferably have an average particle size of 1 to 10 µm and having a monodisperse particle size distribution.

As supports used in the radiographic image conversion panel according to the invention are employed a various types of polymeric materials, glass and metals. Materials which can be converted to a flexible sheet or web are particularly preferred in handling as a information recording material. From this point, there are preferred plastic resin films such as cellulose acetate films, polyester films, polyamide films, polyimide films, triacetate films or polycarbonate films; metal sheets such as aluminum, iron, copper or chromium; or metal sheets having a said metal oxide covering layer.

A thickness of the support depends on properties of the material, and is generally 10 to 1000 µm and preferably 10 to 500 µm in terms of handling. The surface of the support may be glossy or may be matte for the purpose of enhancing adhesiveness to a stimulable phosphor layer. The support may be provided with a subbing layer under the stimulable phosphor layer for the purpose of enhancing adhesiveness to the phosphor layer.

Examples of binders used in the stimulable phosphor layer according to the invention include proteins such as gelatin, polysaccharide such as dextran, natural polymeric materials such as arabic gum and synthetic polymeric materials such as polyvinyl butyral, polyvinyl acetate, nitrocellulose, ethylcellulose, vinylidene chloride/vinyl chloride copolymer, polyalkyl (metha)acrylate, vinyl chloride/vinylacetate copolymer, polyurethane, cellulose acetate butyrate, polyvinyl alcohol and linear polyester. Of these binders are preferred nitrocellulose, linear polyester, polyalkyl (metha)acrylate, a mixture of nitrocellulose and linear polyester, a mixture of nitrocellulose and polyalkyl (metha)acrylate and a mixture of polyurethane and polyvinyl butyral. The binder may be cured with a cross-linking agent.

The stimulable phosphor layer can be coated on a subbing layer, for example, according to the following manner. Thus, an iodide-containing stimulable phosphor, a compound such a phosphite ester for preventing yellow stain and binder are added into an optimal solvent to prepare a coating solution in which phosphor particles and particles of the compound(s) are uniformly dispersed in a binder solution.

In this invention, film-making binders used in the conventional layer constitution are usable as a binder in this invention, including proteins such as gelatin, polysaccharides such as dextrin or Arabic gum, polyvinyl butyral, polyvinyl acetate, nitrocellulose, ethyl cellulose, vinylidene chloride/vinyl chloride copolymer, polymethyl methacrylate, vinyl chloride/vinyl acetate copolymer, polyurethane, cellulose acetate butylate, and polyvinyl alcohol. The binder is employed in an amount of 0.01 to 1 part by weight per 1 part by weight of the stimulable phosphor. A smaller amount of the binder is preferred in terms of sensitivity and sharpness of the radiographic image conversion panel and a range of 0.03 to 0.2 parts by weight is preferred in terms of easiness of coating.

A ratio of the binder to the stimulable phosphor (with the proviso that in the case of all of the binder being an epoxy group-containing compound, the ratio is that of the compound to the phosphor) depends on characteristics of the objective radiographic image conversion panel, the kind of the phosphor and an addition amount of the epoxy group-containing compound. Examples of solvents used for preparing the coating solution include lower alcohols such as methanol, ethanol, 1-propanol, 2-propanol, and n-butanol; chlorine-containing hydrocarbons such as methylene chloride and ethylene chloride; ketones such as acetone, methyl ethyl ketone, methyl isobutyl ketone; esters of a lower fatty acid and lower alcohol such as methyl acetate, ethyl acetate and butyl acetate; ethers such as dioxane, ethylene glycol ethyl ether and ethylene glycol monomethyl ether; toluene; and a mixture thereof.

Examples of solvents used for the coating solution of the stimulable phosphor layer include lower alcohols such as methanol, ethanol 1-propanol and butanol; ketones such as acetone, methyl ethyl ketone, methyl isobutyl ketone and cyclohexanone; esters a lower fatty acid and a lower alcohol, such as methyl acetate, ethyl acetate and butyl acetate; ethers such as dioxane, ethylene glycol monoethyl ether and ethylene glycol monomethyl ether tolyol; aromatic compounds such as tolyol and xylol; halogenated hydrocarbons such as methylene chloride and ethylene chloride; and their mixtures.

There may be incorporated, in the coating solution, a variety of additives, such as a dispersing agent for improving dispersibility of the phosphor in the coating solution and a plasticizer for enhancing bonding strength between the binder and phosphor. Examples of the dispersing agent include phthalic acid, stearic acid, caproic acid and oleophilic surfactants. Examples of the plasticizer include phosphate esters such as triphenyl phosphate, tricresyl phosphate and diphenyl phosphate; phthalate esters such as diethyl phthalate, dimethoxyethyl phthalate; glycolic acid esters such as ethylphthalyethyl glycolate and dimethoxyethyl glycolate; and polyesters of polyethylene glycol and aliphatic dibasic acid such as polyester of triethylene glycol and adipinic acid, and polyester of diethylene glycol and succinic acid.

Stearic acid, phthalic acid, caproic acid or dispersing agents such as lipophilic surfactants may be incorporated to a coating solution for the phosphor layer to enhance dispersibility of stimulable phosphor particles. There may optionally incorporated plasticizers for a binder. Examples of a plasticizer include phthalic acid esters such as diethyl phthalate and dibutyl phthalate, aliphatic dibasic acid esters such as diisodecyl succinate and diocyl adipate, glycolic acid esters such as ethyl glycolate ethyl phthalate and butyl glycolate butyl phthalate.

The coating solution as prepared above was uniformly coated on the surface of the subbing layer to form a coated layer. Coating can be carried out by conventional coating means, such as doctor blade, roll coater and knife coater. Subsequently, the coated layer is gradually heated and dried to complete formation of the stimulable phosphor layer provided on subbing layer. The coating solution of the stimulable phosphor layer can be prepared by using a dispersing apparatus, such as a ball mill, sand mill, atriter, three-roll mill, high-speed impeller, Kady mill and ultrasonic homogenizer. The prepared coating solution is coated on a support by using a doctor blade, roll coater or knife coater and dried to form the stimulable phosphor layer. After the above coating solution may be coated on a protective layer and dried, the stimulable phosphor layer may be adhered to the support. The thickness of the stimulable phosphor layer, depending of characteristics of the radiographic image conversion panel, the kind of stimulable phosphors and the mixing ratio of a binder to phosphor, is preferably 10 to 1,000 μm, and more preferably 10 to 500 μm.

Examples of an europium activated barium fluoroiodide stimulable phosphor have been described so far but a europium activated barium fluorobromide stimulable phosphor and other stimulable phosphors represented by formula (I) can also be prepared similarly to the methods described above.

EXAMPLES

The present invention will be described based on examples but embodiments of the invention are by no means limited to these.

Example 1

A precursor of europium activated barium fluoroiodide stimulable phosphor was synthesized as follows. 2500 ml of an aqueous $BaI_2$ solution (4 mol/l) and 26.5 ml of $EuI_3$ solution (0.2 mol/l) were added to a pressure reaction vessel provided with two openings. Further to the aqueous solution, 992 g of potassium iodide was added. Reaction mother liquor was maintained at 95° C. with stirring. Then, 600 ml of an aqueous ammonium fluoride solution (10 mol/l) was added to the mother liquor using a roller pump to form precipitates, while performing concentration by blowing dry air at 15 L/min to remove water from the reaction mixture. The addition of an aqueous ammonium fluoride solution and the concentration continued over a period of 133 min and 170 min., respectively; i.e., the addition time (a) was 133 min. and the concentration time (b) was 170 min. (a/b=0.78). The weight ratio of a reaction mixture between before and after blowing dry air (i.e., the weight ratio of a reaction mixture immediately after completion of blowing dry air to a reaction mixture immediately before start of blowing dry air) was 0.92. Stirring continued for 90 min. with maintaining the temperature as it was. Thereafter, filtration was conducted and washing was conducted with 2000 ml of ethanol.

To prevent change of particle shape and change of particle size distribution due to fusion between particles, super fine-grained alumina powder was added in an amount of lo by weight and stirring was sufficiently performed in a mixer to allow the super fine-grained alumina powder to be uniformly adhered on the surface of crystals. The thus obtained phosphor precursor was charged into a quartz boat and calcined in an atmosphere of a gas mixture comprised of 95% (by volume) nitrogen and 5% hydrogen at 850° C. for 2 hr. using a tube furnace to obtain europium activated barium fluoroiodide stimulable phosphor.

Example 2

To synthesize a precursor of europium activated barium fluordiodide stimulable phosphor, 2500 ml of an aqueous $BaI_2$ solution (4 mol/l) and 26.5 ml of $EuI_3$ solution (0.2 mol/l) were added to a pressure reaction vessel provided with two openings. To the aqueous solution, 992 g of potassium iodide was added. Reaction mother liquor was maintained at 95° C. with stirring. Then, 600 ml of aqueous ammonium fluoride solution (10 mol/l) was added to the mother liquor using a roller pump to form precipitates, while performing concentration of the reaction mixture by blowing dry air at 20 L/min. The addition time (a) was 132 min. and the concentration time (b) was 150 min. (a/b=0.88). After completion of reaction, the weight ratio of a reaction mixture between before and after blowing dry air was 0.98. Stirring continued for 90 min. with maintaining the temperature as it was. Thereafter, filtration was conducted and washing was conducted with 2000 ml of ethanol.

The subsequent procedure was performed similarly to Example 1 to obtain europium activated barium fluoroiodide stimulable phosphor.

Example 3

Similarly to Example 1, europium activated barium fluoroiodide stimulable phosphor was prepared, except that the phosphor precursor was calcined in an atmosphere of gas mixture comprised of 93% (by volume) nitrogen, 5% hydrogen and 2% oxygen.

Comparative Example 1

To synthesize a precursor of europium activated barium fluoroiodide stimulable phosphor, 2500 ml of an aqueous $BaI_2$ solution (4 mol/l) and 26.5 ml of $EuI_3$ solution (0.2 mol/l) were added to a pressure reaction vessel provided with two openings. To the aqueous solution, 992 g of potassium iodide was added. Reaction mother liquor was maintained at 92° C. with stirring. Then, 600 ml of aqueous ammonium fluoride solution (10 mol/l) was added to the mother liquor to form precipitates, using a roller pump, while performing concentration of the reaction mixture by blowing dry air at 10 L/min. The addition time (a) was 196 min. and the concentration time (b) was 200 min. (a/b=0.98). After completion of reaction, the weight ratio of a reaction mixture between before and after blowing dry air was 0.92. Stirring continued for 90 min. with maintaining the temperature as it was. Thereafter, filtration was conducted and washing was conducted with 2000 ml of ethanol.

The subsequent procedure was performed similarly to Example 1 to obtain europium activated barium fluoroiodide stimulable phosphor.

Comparative Example 2

To synthesize a precursor of europium activated barium fluoroiodide stimulable phosphor, 2500 ml of an aqueous $BaI_2$ solution (4 mol/l) and 26.5 ml of $EuI_3$ solution (0.2 mol/l) were added to a pressure reaction vessel provided with two openings. To the aqueous solution, 992 g of potassium iodide was added. Reaction mother liquor was maintained at 92π C. with stirring. Then, 600 ml of aqueous ammonium fluoride solution (10 mol/l) was added to the mother liquor to form precipitates, using a roller pump, while performing concentration of the reaction mixture by blowing dry air at 15 L/min. The addition time (a) was 33 min. and the concentration time (b) was 165 min. (a/b=0.20). After completion of reaction, the weight ratio of a reaction mixture between before and after blowing dry air was 0.70. Stirring continued for 90 min. with maintaining the temperature as it was. Thereafter, filtration was conducted and washing was conducted with 2000 ml of ethanol.

The subsequent procedure was performed similarly to Example 1 to obtain europium activated barium fluoroiodide stimulable phosphor.

Comparative Example 3

To synthesize a precursor of europium activated barium fluoroiodide stimulable phosphor, 2500 ml of an aqueous $BaI_2$ solution (4 mol/l) and 26.5 ml of $EuI_3$ solution (0.2 mol/l) were added to a pressure reaction vessel provided with two openings. To the aqueous solution, 992 g of potassium iodide was added. Reaction mother liquor was maintained at 92° C. with stirring. Then, 600 ml of aqueous ammonium fluoride solution (10 mol/l) was added to the mother liquor using a roller pump to form precipitates, while performing concentration of the reaction mixture by blowing dry air at 15 L/min. The addition time (a) was 167 min. and the concentration time (B) was 170 min. (a/b=0.98). After completion of reaction, the weight ratio of a reaction mixture between before and after blowing dry air was 0.98. Stirring continued for 90 min. with maintaining the temperature as it was. Thereafter, filtration was conducted and washing was conducted with 2000 ml of ethanol.

The subsequent procedure was performed similarly to Example 1 to obtain europium activated barium fluoroiodide stimulable phosphor.

Comparative Example 4

To synthesize a precursor of europium activated barium fluoroiodide stimulable phosphor, 2500 ml of an aqueous $BaI_2$ solution (4 mol/l) and 26.5 ml of $EuI_3$ solution (0.2 mol/l) were added to a pressure reaction vessel provided with two openings. To the aqueous solution, 992 g of potassium iodide was added. Reaction mother liquor was maintained at 95° C. with stirring. Then, 600 ml of aqueous ammonium fluoride solution (10 mol/l) was added to the mother liquor using a roller pump to form precipitates, while performing concentration of the reaction mixture by blowing dry air at 15 L/min. The addition time (a) was 162 min. and the concentration time (b) was 170 min. (a/b=0.98). After completion of reaction, the weight ratio of a reaction mixture between before and after blowing dry air was 0.92. Stirring continued for 90 min. with maintaining the temperature as it was. Thereafter, filtration was conducted and washing was conducted with 2000 ml of ethanol.

To prevent change of particle shape and change of particle size distribution due to fusion between particles, super fine-grained alumina powder was added in an amount of 1% by weight and stirring was sufficiently performed in a mixer to allow the super fine-grained alumina powder to be uniformly adhered on the surface of crystals. The thus obtained phosphor precursor was charged into a quartz boat and calcined in an atmosphere of a gas mixture comprised of 95% (by volume) nitrogen and 5% hydrogen at 300° C. for 2 hr. using a tube furnace to obtain europium activated barium fluoroiodide stimulable phosphor.

Radiation Image Conversion Panel 1-6

Preparation of Phosphor Layer Coating Solutions 1-6

To a mixed solvents (cyclohexane:methyl ethyl ketone:toluene=6:2:2) were added 500 g of each of the europium activated barium fluoroiodide stimulable phosphors obtained in Examples 1 and 2 and Comparative Examples 1 through 4, and polyurethane resin (Niporan 2304, produced by Nippon Polyurethane Kogyo Co., MDI type, solid content of 35%) exhibiting a Tg of 30° C. in an amount of resin/(phosphor+resin)=15% by volume (solid ratio). The mixture was stirred by a propeller mixer to prepare phosphor layer coating solutions 1 through 6.

Preparation of Sublayer Coating Solution 100 parts of polyester resin (Biron 53SS, produced by Toyo Boseki Co., Ltd.) was mixed with 3 parts of a polyfunctional isocyanate compound (Colonate HX, produced by Nippon Polyurethane Kogyo Co.). The mixture was added to mixed solvents (methyl ethyl ketone:toluene=1:1) and dispersed using a propeller mixer to prepare a sublayer coating solution exhibiting a viscosity of 500 mPa·s.

Preparation of Phosphor Sheets 1-6

Coating of Sublayer

On a 250 μm thick, carbon-kneaded black PET support was coated the foregoing sublayer coating solution, using a knife coater so as to have a dry thickness of 30 μm and dried to prepare a subbed support.

Coating of Phosphor Layer

On the subbed support was coated each of the foregoing phosphor layer coating solutions 1 through 6 so as to have a dry thickness of 180 μm and dried to prepare phosphor sheets 1 through 6.

Preparation of Moistureproof Protective Film

A film having the following constitution (A) was used as a protective film of the phosphor layer side of the phosphor sheets 1-6:

Constitution (A)

VMPET 12//VMPET 12/PET 12//Sealant Film.

In the foregoing, "PET" represents polyethylene terephthalate, "sealant Film" represents a thermally fusible film of CPP (casting polypropylene) or LLDPE (low-density linear polyethylene), and "VMPET" represents alumina-deposited PET (commercially available from Toyo Metalizing Co.); numerals designated behind the respective resin films represent a film thickness (μm). Designation "://" means a dry-lamination adhesion layer having a adhesive layer thickness of 2.5 μm. An adhesive used for dry lamination was a two-solution reaction type urethane adhesive. An organic blue colorant (Zabon Fast Blue 3G, produced Hoechst Co.) which was previously dispersed methyl ethyl ketone, was added into the used adhesive solution, whereby all of the adhesive layer became an excitation light-absorptive layer. The light transmittance of the excitation light-absorptive layer was controlled by adjusting the addition amount.

A dry-laminated film having a constitution of sealant film/aluminum foil film 9 μm/PET 188 μm was used as a protective film on the back side of the support of the respective phosphor sheets 1 through 6. In that case, the adhesive layer thickness was 1.5 μm, in which a two-solution reaction type urethane adhesive was used.

Konica Medical Co., Ltd.) and then excited by scanning with a 200 mW semi-conductor laser (780 nm). Then, the stimulated emission emitted from the phosphor layer was captured by a detector to convert electric signals, subjected to analog-digital conversion and recorded on a magnetic tape. The x-ray images recorded on the magnetic tape was analyzed by computer and represented by the modulation transfer function (MTF). The MTF was represented by percentage at a special frequency of 2 cycles/mm, as shown in Table 1.

TABLE 1

|  | a/b*1 | Weight Ratio*2 | Calcination Temperature (° C.) | Average Particle Size (μm) | Standard Deviation | Sensitivity | Sharpness | Panel No.*3 |
| --- | --- | --- | --- | --- | --- | --- | --- | --- |
| Example 1 | 0.78 | 0.92 | 850 | 5.8 | 1.1 | 150 | 125 | 1 |
| Example 2 | 0.88 | 0.98 | 850 | 4.9 | 1.0 | 130 | 120 | 2 |
| Example 3 | 0.78 | 0.92 | 850 | 5.8 | 1.1 | 200 | 150 | 3 |
| Comp. Example 1 | 0.98 | 0.92 | 850 | 6.2 | 1.8 | 100 | 100 | 4 |
| Comp. Example 2 | 0.20 | 0.70 | 850 | 4.0 | 2.1 | 50 | 95 | 5 |
| Comp. Example 3 | 0.98 | 0.98 | 850 | 5.6 | 2.1 | 45 | 40 | 6 |
| Comp. Example 4 | 0.98 | 0.92 | 300 | 6.2 | 1.8 | 10 | 10 | 7 |

*1 ratio of addition time (a) to concentration time (b)
*2 weight ratio of reaction mixture between before and after air-blowing
*3 radiation image conversion panel Preparation of Radiation Image Conversion Panels 1-6

The thus prepared phosphor sheets 1 through 6 were each cut to a square having an edge length of 45 cm. The peripheral portion of each of them was fused and sealed by an impulse sealer under reduced pressure, using the foregoing moisture-proof protective film to obtain radiation image conversion panels 1 to 6. The impulse sealer used in fusion employed a 8 mm wide heater.

Evaluation

Particle Size Distribution

From electronmicrograph of phosphor particles (crystals), 200 particles were selected at random, and an average particle size and a particle size distribution (expressed in terms of standard deviation) were determined based on a sphere-converted volume particle size.

Characteristics of the radiation image conversion panels were evaluation as follows.

Sensitivity

Each of the prepared radiographic image conversion panels was exposed to X-rays at 80 KVp and then excited by the light of a He—Ne laser (633 nm). Then, the stimulated emission emitted from the phosphor layer was captured by a detector (photomultiplier with a spectral sensitivity of S-5) to measure the intensity of the emission. The sensitivity was represented by a relative value, based on the sensitivity panel 3 being 100, as shown in Table 1.

Sharpness

The radiation image conversion panels, each was exposed to X-rays at a tube voltage of 80 KVp through a rectangular wave chart used for MTF measurement (available from As apparent from Table 1, it was proved that samples of the invention were superior to comparative samples.

What is claimed is:

1. A method of preparing a precursor of a rare earth activated alkaline earth metal fluorohalide stimulable phosphor represented by the following formula (1)

$$Ba_{(1-x)}M_{2(x)}FBr_{(y)}I_{(1-y)}:aM_1, bLn, cO \qquad \text{formula (1)}$$

wherein $M_1$ is at least an alkali metal selected from the group consisting of Li, Na, K, Rb and Cs; $M_2$ is at least an alkaline earth metal selected from the group consisting of Be, Mg, Ca and Sr; Ln is at least one rare earth element selected from the group consisting of Ce, Pr, Sm, Eu, Gd, Tb, Tm, Dy, Ho, Nd, Er and Yb; and x, y, a, b and c are values meeting the following conditions:

$$0 \leq x \leq 0.3,\ 0 \leq y \leq 0.3,\ 0 \leq a \leq 0.05\ 0 < b \leq 0.2 \text{ and } 0 \leq c \leq 0.1,$$

the method comprising the steps of:

(A) adding an aqueous solution of an inorganic fluoride into a mother liquor containing a barium halide to form a reaction mixture containing a precursor of the stimulable phosphor over a period of "a", and (B) removing a solvent from the reaction mixture over a period of "b" to concentrate the reaction mixture, wherein the steps (A) and (B) are started at the same time, and meeting the following requirement: 0.25<a/b<0.95.

2. The method of claim 1, wherein a ratio by weight of a reaction mixture after completing step (B) to a reaction mixture before starting step (B) is 0.05 to 0.95.

3. The method of claim 1, wherein in step (B), said removing solvent is conducted by at least one selected from the group of (i) allowing a dry gas to pass through the reaction mixture, (ii) maintaining the inside of a reaction vessel containing the reaction mixture and (iii) forming a wetted wall of the solvent.

4. The method of claim 1, wherein in step (B), said removing solvent is conducted by allowing a dry gas to pass through the reaction mixture.

5. The method of claim 1, wherein in step (B), said removing solvent is conducted by maintaining the inside of a reaction vessel containing the reaction mixture.

6. The method of claim 1, wherein in step (B), said removing solvent is conducted by forming a wetted wall of the solvent.

7. A method of preparing a rare earth activated alkaline earth metal fluorohalide stimulable phosphor represented by the following formula (1)

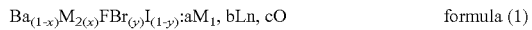
$$Ba_{(1-x)}M_{2(x)}FBr_{(y)}I_{(1-y)}:aM_1, bLn, cO \qquad \text{formula (1)}$$

wherein $M_1$ is at least an alkali metal selected from the group consisting of Li, Na, K, Rb and Cs; $M_2$ is at least an alkaline earth metal selected from the group consisting of Be, Mg, Ca and Sr; Ln is at least one rare earth element selected from the group consisting of Ce, Pr, Sm, Eu, Gd, Tb, Tm, Dy, Ho, Nd, Er and Yb; and $0 \leq x \leq 0.3$, $0 \leq y \leq 0.3$, $0 \leq a \leq 0.05$ $0 < b \leq 0.2$ and $0 \leq c \leq 0.1$;

the method comprising the steps of:
(A) adding an aqueous solution of an inorganic fluoride into a mother liquor containing a barium halide to form a reaction mixture containing a precursor of the stimulable phosphor over a period of "a",
(B) removing a solvent from the reaction mixture over a period of "b" to concentrate the reaction mixture,
(C) separating the precursor from the reaction mixture, and
(D) subjecting the separated precursor to calcination at a temperature of 400 to 1300° C. over a period of 5 to 12 hr., wherein the steps (A) and (B) are started at the same time, and meeting the following requirement: $0.25 < a/b < 0.95$.

8. The method of claim 7, wherein in step (D), the precursor is subjected to calcination in an atmosphere of a gas mixture containing oxygen.

* * * * *